US008876305B2

(12) United States Patent
Mueller

(10) Patent No.: US 8,876,305 B2
(45) Date of Patent: Nov. 4, 2014

(54) REARVIEW MIRROR FOR VEHICLES

(75) Inventor: Dirk Mueller, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 728 days.

(21) Appl. No.: 12/125,524

(22) Filed: May 22, 2008

(65) Prior Publication Data

US 2008/0291560 A1 Nov. 27, 2008

(30) Foreign Application Priority Data

May 22, 2007 (EP) .................................... 07010132

(51) Int. Cl.
 *B60R 1/062* (2006.01)
 *G02B 7/198* (2006.01)
 *B60R 1/074* (2006.01)
 *B60R 1/06* (2006.01)
 *B60R 1/076* (2006.01)
 *B60R 21/34* (2011.01)
(52) U.S. Cl.
 CPC . *B60R 1/06* (2013.01); *B60R 1/074* (2013.01); *G02B 7/198* (2013.01); *B60R 1/062* (2013.01); *B60R 2021/343* (2013.01); *B60R 1/076* (2013.01)
 USPC .......................................... 359/841; 359/872
(58) Field of Classification Search
 CPC ........ B60R 1/062; B60R 1/074; B60R 1/076; G02B 7/198
 USPC ................... 359/841, 871, 872, 877
 See application file for complete search history.

(56) References Cited

U.S. PATENT DOCUMENTS

| 3,711,179 | A | * | 1/1973 | Takeda ........................ 359/508 |
| 3,874,773 | A | * | 4/1975 | Kurz, Jr. ...................... 359/871 |
| 4,175,833 | A | * | 11/1979 | Talbot ......................... 359/876 |
| 4,464,017 | A | * | 8/1984 | Wada ........................... 248/549 |
| 4,620,777 | A | * | 11/1986 | Tsai ............................. 359/507 |
| 5,165,745 | A | * | 11/1992 | Liao ............................ 296/1.11 |
| 5,198,929 | A | * | 3/1993 | Clough ....................... 359/513 |
| 5,245,480 | A | * | 9/1993 | Polzer ......................... 359/841 |
| 5,604,644 | A | * | 2/1997 | Lang et al. .................. 359/871 |
| 5,615,054 | A | * | 3/1997 | Lang et al. .................. 359/844 |
| 5,621,570 | A | * | 4/1997 | Hack et al. .................. 359/507 |
| 5,621,577 | A | * | 4/1997 | Lang et al. .................. 359/872 |
| 5,781,353 | A | * | 7/1998 | Seubert et al. ............... 359/841 |
| 5,798,882 | A | * | 8/1998 | Lang ............................ 359/872 |

(Continued)

FOREIGN PATENT DOCUMENTS

| DE | 1455954 A1 | 2/1969 |
| FR | 2748709 A | 11/1997 |
| GB | 1224523 A | 3/1971 |
| WO | WO 01/87667 A | 11/2001 |

OTHER PUBLICATIONS

European Search Report for EP 07010132 dated Dec. 6, 2007.

*Primary Examiner* — Ricky D Shafer
(74) *Attorney, Agent, or Firm* — Reising Ethington P.C.

(57) ABSTRACT

The rear-view mirror comprises a mirror housing, in which a mirror glass is disposed. It is surrounded by a rim portion, wherein at least a part of the rim portion is configured moveable relative to the mirror housing. Said part can be configured elastically resilient, linked with the mirror housing, or it can be provided detachable. When the mirror housing touches its installed elements during an evasive movement, the corresponding part of the rim portion can move, whereby an additional travel distance for the mirror housing is provided.

4 Claims, 5 Drawing Sheets

(56) References Cited

U.S. PATENT DOCUMENTS

| | | | |
|---|---|---|---|
| 5,975,707 A * | 11/1999 | Kato | 359/841 |
| 6,170,956 B1 * | 1/2001 | Rumsey et al. | 359/839 |
| 6,471,362 B1 * | 10/2002 | Carter et al. | 359/871 |
| 6,481,863 B2 * | 11/2002 | Horio et al. | 359/872 |
| 6,499,850 B2 * | 12/2002 | Waldmann | 359/603 |
| 6,595,576 B2 * | 7/2003 | Mizutani et al. | 296/152 |
| 6,672,731 B2 * | 1/2004 | Schnell et al. | 359/877 |
| 6,712,329 B2 * | 3/2004 | Ishigami et al. | 248/475.1 |
| 6,830,352 B2 * | 12/2004 | Lang et al. | 359/872 |
| 7,287,868 B2 * | 10/2007 | Carter et al. | 359/871 |

* cited by examiner

REARVIEW MIRROR FOR VEHICLES

BACKGROUND OF THE INVENTION

The invention is based on a priority patent application EP 07010132.4 which is hereby incorporated by reference.

The invention relates to a rearview mirror for vehicles, comprising a mirror housing, in which a mirror glass is disposed, which is surrounded by a rim portion, wherein at least a part of the rim portion is configured moveable relative to the mirror housing.

Exterior rearview mirrors of motor vehicles are known in which the mirror housing can be pivoted in or against the driving direction under a respective load. The mirror housing including mirror glass and adjustment drive and other installed components is therefore pivotally supported at a mirror base, by which the exterior rearview mirror is mounted to the motor vehicle. In particular in exterior rearview mirrors in which the mirror housing is pivotable about a tilted axis with respect to the mirror base, the mirror housing has to be capable of changing its position relative to the mirror glass carrier or relative to the mirror glass, without the mirror housing being restricted in its movement by said components.

SUMMARY OF THE INVENTION

Thus, it is the object of the invention to configure the rearview mirror of this type, so that the mirror housing can be moved reliably relative to its installed components, when a respective force is applied.

This object is accomplished according to the invention in a rearview mirror for vehicles, comprising a mirror housing, in which a mirror glass is disposed, which is surrounded by a rim portion, wherein at least a part of the rim portion is configured moveable relative to the mirror housing.

In the rearview mirror according to the invention at least part of the rim portion is provided moveable relative to the mirror housing.

When the mirror housing contacts its installed components, in particular the mirror glass carrier or the mirror glass during its evasive movement, then this contact occurs in the rim portion. Since at least part of said rim portion is configured moveable relative to the mirror housing, the contacting part of the rim portion can recede, so that the mirror housing can perform the evasive movement correctly.

Said part of the rim portion can e.g. be configured elastically resilient, so that said part can perform an evasive movement in case of a collision e.g. with the mirror glass or with the mirror glass carrier.

It is also possible to configure said part of the rim portion, so that it breaks off in case of a collision with the mirror glass or the mirror glass carrier. This can be facilitated by providing at least one rated break point.

It is also possible to configure said part of the rim portion, so that it disengages from the mirror housing in case of a collision, e.g. by disengaging a clipped on part of the rim portion from the mirror housing.

In case the part of the rim portion is completely disengaged from the mirror housing, said part can be secured by suitable capture means, so that parts disengaging from the mirror housing cannot create endangerment.

In order to achieve resiliency of part of the rim portion, said part can be pivotably supported at the mirror housing e.g. by inserting a film linkage. Thus said segment can pivot away, when loaded by pressure, so that the evasive movement of the mirror housing is not restricted.

It is also possible to configure part of the rim portion itself elastically resilient, e.g. to make it from a respective elastomeric material. Then said part of the rim portion is elastically resilient during a collision.

It is also possible to connect part of the rim portion to the mirror housing through an elastomeric intermediary layer, so that the segment can bend away relative to the mirror housing through the elastomeric intermediary layer during a collision. When the loading is terminated said part of the rim portion returns into its initial position again. This has the advantage that the mirror housing is not damaged by the collision.

The moveable part of the rim portion can be an additional component, which is configured painted, unpainted, textured or similar. It can be made from plastic or metal, a soft material component, e.g. rubber, or it can be comprised of a two component part, e.g. an integrally molded rubber portion. The mirror housing itself can e.g. be placed onto a carrier or onto a base plate and can be guided there, clipped on, snapped in or interlocked. The mirror housing itself can be configured integrally or in several components itself. The rim portion can be configured as a frame, to which a mirror shell is connected as an outer skin.

The entire rim portion can be configured elastically resilient, so that it is assured that the mirror housing can always perform its evasive movement irrespective in which part of the rim portion the collision with the mirror glass or the mirror glass carrier occurs.

The rearview mirror according to the invention is advantageously suited for embodiments, in which the pivot axis of the mirror housing is aligned at a slant. Thereby additional horizontal force components, or force components, which are orthogonal to the slanted pivot axis, occur during shock loading. Such rearview mirrors with slanted pivot axes comply with the legal requirements with respect to pendulum impact testing without problems. Due to the configuration according to the invention the mirror housing can change its position relative to the mirror carrier plate, or it can perform an evasive upward movement. During a collision the movable part of the rim portion can unclip, evade, break off, or similar, which creates additional travel distance for the mirror housing.

In particular in larger motor vehicles like SUV's, vans, or passenger vans, the size of the rearview mirrors is continuously increasing. This necessitates the ever increasing mirror areas have to be disposed in mirror housings. Pivoting for adjusting the mirror glass requires a larger overhang of the rim portion of the mirror housing, so that the mirror glass does not protrude from the mirror housing. The large overhang of the mirror housing relative to the mirror glass, thus created brings as a consequence that a body colliding with the rearview mirror can be wedged between the mirror glass and the rim portion of the mirror housing, which prevents correct pivoting of the mirror housing.

BRIEF DESCRIPTION OF THE DRAWINGS

Additional features of the invention can be derived from the additional claims and from the drawings.

The invention is described in more detail with reference to embodiments illustrated in the drawings, wherein.

DETAILED DESCRIPTION OF THE DRAWINGS

Figure 1:
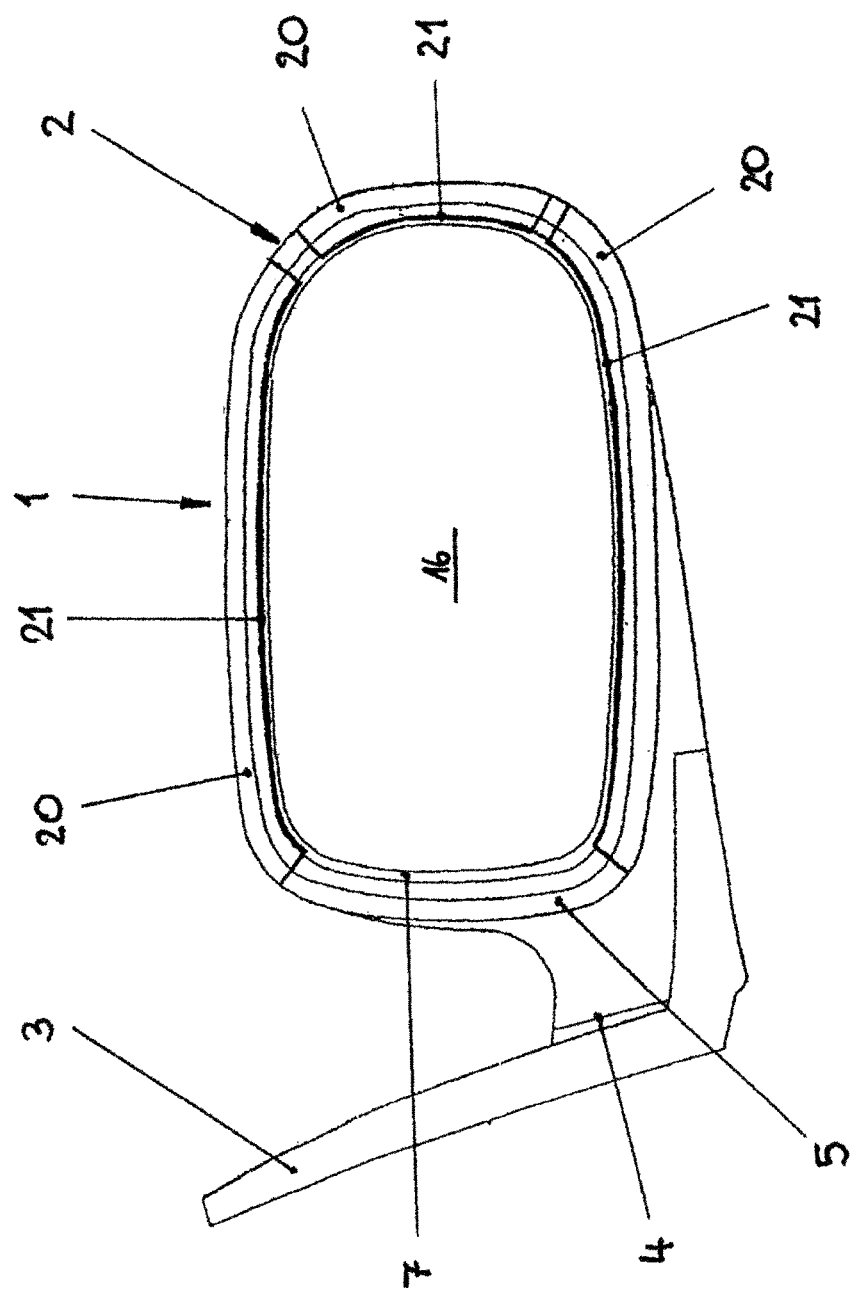
FIG. 1 is a view onto the mirror glass side of a rearview mirror according to the invention, comprising moveable parts of the rim portion.

FIG. 1 is a view of a mirror glass 16 of an exterior rearview mirror 1 of a motor vehicle comprising moveable parts of the rim portion 5 of the mirror housing 2. The rearview mirror 1 comprises a mirror base 3, which is to be mounted to the body of the vehicle, at which mirror base the mirror housing 2 is supported pivotable in or against driving direction 10. Between the mirror base 3 and the mirror housing 2, a separation gap 4 is provided, which allows for the necessary clearance for correct and unhindered pivoting of the mirror housing 2.

The mirror housing 2 has an opening 6, which is essentially closed by the mirror glass 16. Between the mirror glass 16 and the inside rim of the portion 5 of the mirror housing 2, a narrow circumferential gap 7 is provided, which allows the mirror glass 16 to be pivoted unhindered in vertical and in horizontal directions.

In the upper part, in the lower part, and in the segment of the rim portion 5 remote from the body, moveable or detachable partial portions 20 are provided. They are defined by a parting line 21 with respect to the mirror housing 2. In case of a loading of the rearview mirror 1, these forces acting upon the mirror housing 2, or upon the mirror glass 16 can cause a relative movement between the mirror glass 16 and the mirror housing 2. If the load on the mirror glass 16 is too high, the circumferential gap 7 between the rim portion 5 and the mirror glass 16 can be bridged, and the mirror glass 16 can come in contact with the rim portion 5. In a case like this the mirror glass 16 can get wedged at the rim portion 5. In this case there is the risk that the body loading the rearview mirror can get wedged between mirror glass 16 and the rim portion 5. If the colliding body is a part of human body, substantial injuries can occur. In order to circumvent such wedging between the mirror glass 16 and the rim portion 5, at least a small segment of the rim portion 5 is capable to perform an appropriate evasive movement, when loaded by the mirror glass 16 or by the colliding body. Hereby it is possible that said part of the rim portion 5 completely disengages from the mirror housing 2 or that it can move in a manner, so that the described wedging between the mirror glass 16 and the rim portion 5 is prevented.

The rim portion 5 can be integrally formed by the mirror housing 2. It is also possible to form the rim portion 5 by a separate attached mirror frame.

Figure 2:
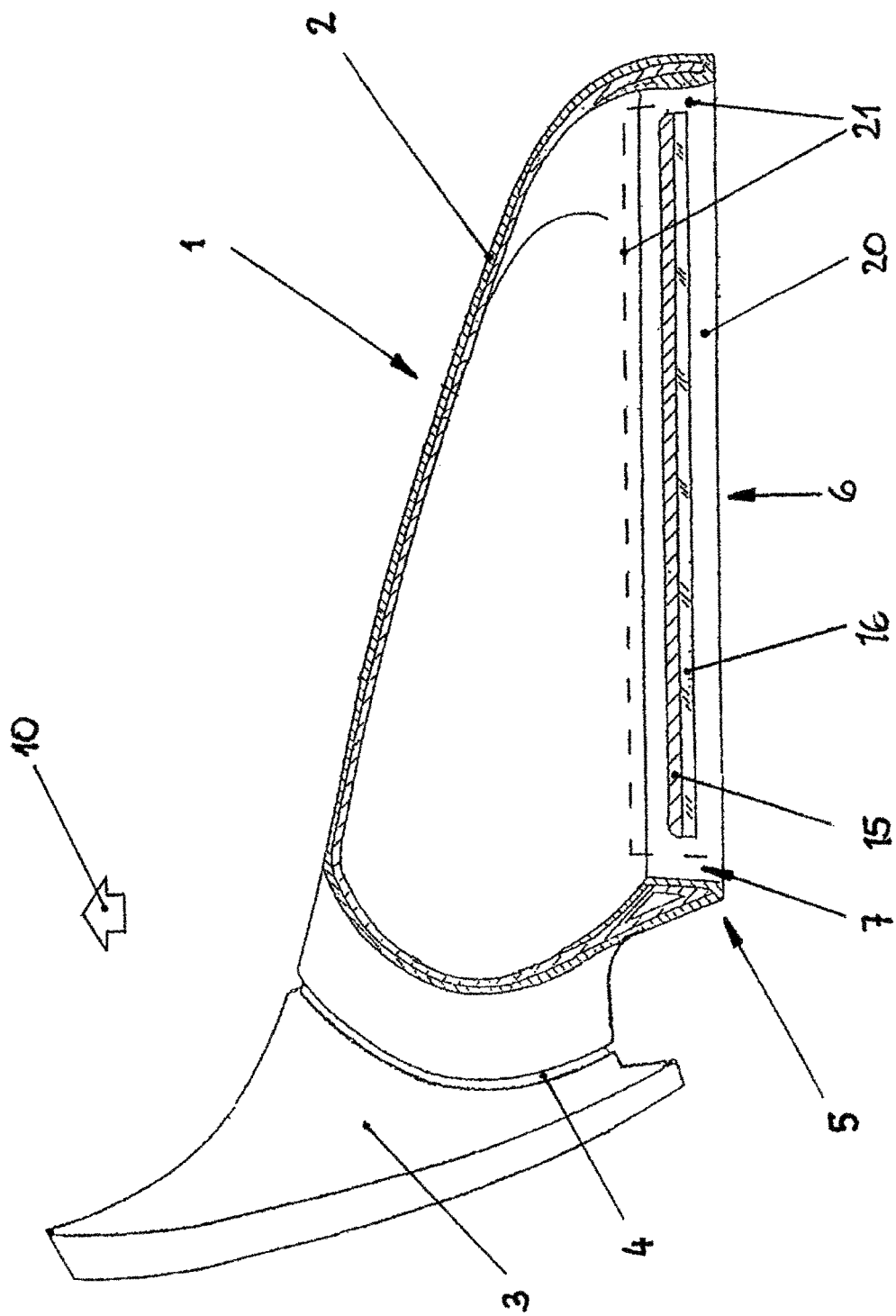
FIG. 2 shows the rearview mirror according to FIG. 1 in a partial top view and in a partial horizontal sectional view.

The moveable part of the rim portion 5 is indicated by a dashed separation line 21 in FIG. 2. Along this separation line 21 a segment 20 of the rim portion can be disengaged from the mirror housing 2. However, a relative movability between the part 20 of the rim portion 5 and the mirror housing 2 is also possible along the dividing line 21. The removable or moveable partial portions 20 of the rim portion 5 are configured, so that a wedging between the mirror glass 16 and said partial portions 20 is prevented.

Figure 3:
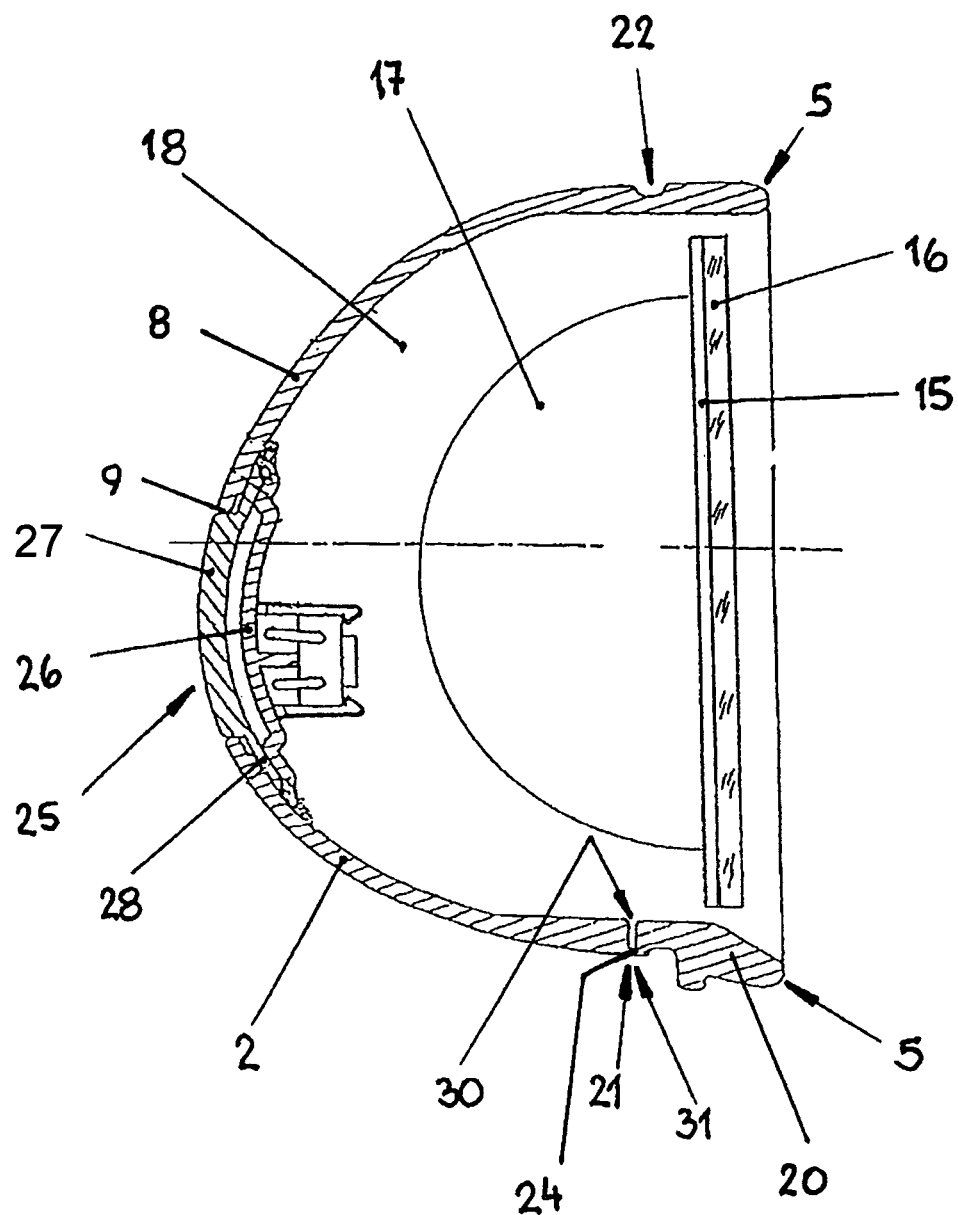
FIG. 3 is a vertical sectional view of the rearview mirror comprising a part of the rim portion of the mirror housing, which can be disengaged by a rated break point.

As shown in FIG. 3, the mirror glass 16 sits on a mirror glass carrier 15, which can be adjusted in a known manner by means of an adjustment drive 17. The mirror housing 2 comprises rear wall 8, facing forward in driving direction and having concave curvature in cross section. The mirror housing can be closed or it can comprise an opening 9, into which a repeater flash light 25 can be inserted. It comprises a light pane 26, which is affixed on the inside of the rear wall 8 by a rim 28, which is reduced in thickness. The outside of the light pane 26 is preferably positioned flush with the outside of the rear wall 8. The light pane 26 is part of a light housing 27, which is situated within the interior cavity 18 of the mirror housing 2.

The mirror housing 2 is provided with a water drain gutter 22 at its upper side, close to the rim portion 5. In FIG. 3 an opposite partial portion 20 of the rim portion 5 is depicted, which is connected to the rest of the mirror housing 2 through a rated break point 31. The rated break point 31 extends along the separation line 21 and is provided at the inside of the mirror housing 2, so that it is not visible from the outside. The rated break point 31 is formed by the partial portion 20 being connected to the mirror housing 2 by a thin bar 24. A gap 30 is provided in the portion of the bar 24 between the partial portion 20 and the mirror housing 2.

When the mirror glass 16 and the mirror housing 2 are moved relative to each other under a respective load on the rearview mirror and the mirror glass 16 or the mirror glass carrier 15 come in contact with the partial portion 20, the partial portion 20 can break off at the rated break point 31 under a load that is sufficiently high. The thin bar 24 facilitates the break off. The load under which the fracture occurs is adjustable in a simple manner through the thickness of the bar 24.

Figure 4:
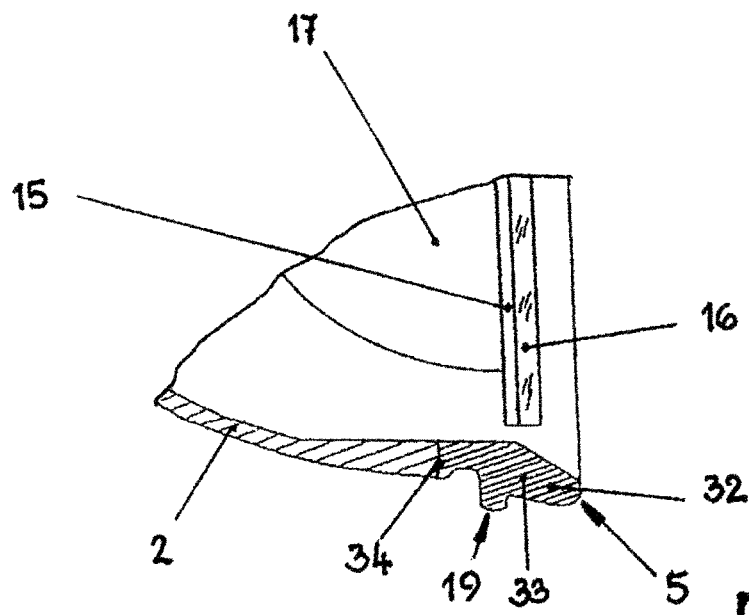
FIG. 4 is a partial sectional view showing a moveable, elastic part of the rim portion of the mirror housing.

In the embodiment according to FIG. 4 the rim portion 5 is formed by a circumferential elastic frame 33, which is connected to the mirror housing 2 through a contact portion 34. The frame 33 is advantageously comprised of an elastomeric material and it is molded onto the mirror housing 2, which is also comprised of plastic, by means of a two component injection molding method. The shape of the frame 33 is configured, so that the outward appearance of the mirror housing is not changed. This way the frame 33 can comprise e.g. a water drip off edge 19, as provided e.g. in the embodiment according to FIG. 4. The frame 33 is elastically moveable, so that it can recede upon contact with the mirror glass 16 and/or the mirror glass carrier 15. Subsequently the elastically deformed part returns to its initial position again.

The rim portion 5 can be formed in its entirety by a circumferential frame 33, which is molded onto the mirror housing 2. But it is certainly also possible to manufacture only particular rim portions from the elastic material 32.

Figure 5:
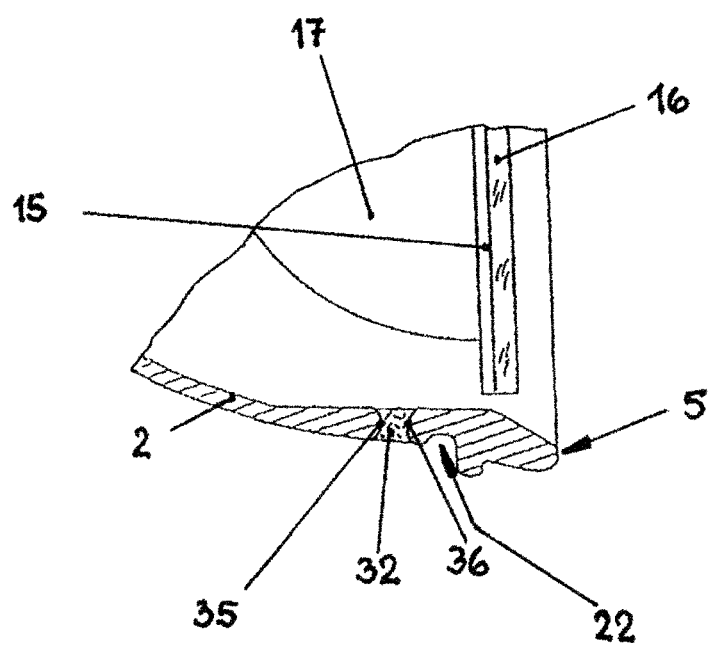
FIG. 5 is a partial sectional view showing a part of the rim portion of the mirror housing, which is moveable through an elastic connection.

In the embodiment according to FIG. 5 the rim portion 5 is connected to the mirror housing 2 through an elastomeric intermediate layer 32. According to the previous embodiment this rim portion 5 can be configured as a circumferential frame, which is connected to the mirror housing 2 through the elastomeric intermediate layer 32. Like in the previous embodiment, also only one or several partial portions of the rim portion 5 can be connected to the mirror housing 2 through said elastomeric intermediate layer 32. The rims 35, 36, facing one another, of the mirror housing 2 and of the rim portion 5 are curved respectively in a convex manner in cross section. Thereby a reliable connection of the rim portion 5 to the mirror housing 2 is achieved through the intermediate layer 32. When the mirror glass 16 and/or the mirror glass carrier 15 impact the rim portion 5 under a respective exterior load, it can pivot away from the mirror housing 2 due to the elastic intermediate layer 32. Thus, the rim portion 5 itself can be comprised of hard plastic, and does not have to be comprised of elastically resilient material itself. On the outside of the rim portion 5 e.g. the water drain gutter 22 is provided, which can also be provided in the embodiment according to FIG. 4. The intermediate layer 32 has a thickness, so that it forms a continuous transition in the transition portion between the mirror housing 2 and the rim portion 5. Thereby the inside, as well as the outside of the mirror housing in the portion of the intermediate layer 32 are not provided with a shoulder, but the inside and outside of the intermediate layer 32 form a continuous extension of the inside or outside of the mirror housing 2 and of the rim portion 5.

Figure 6:
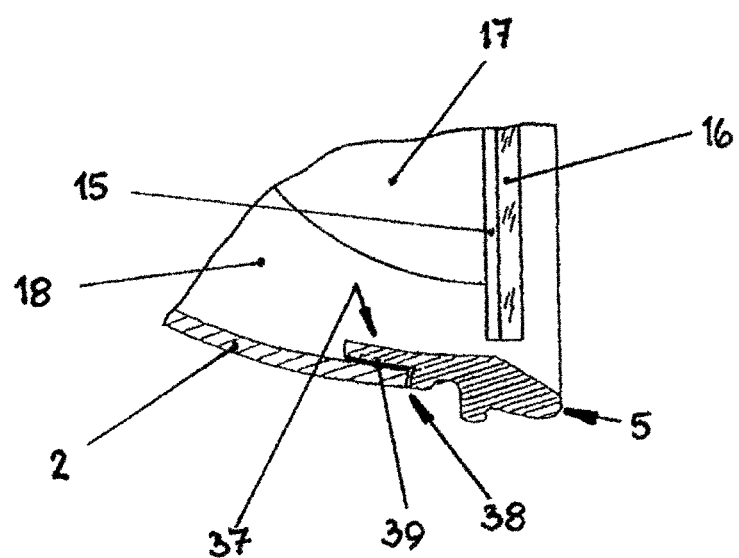
FIG. 6 shows a disengageable part of the rim portion of the mirror housing, which is connected to the mirror housing through a flange.

In the embodiment according to FIG. 6 the rim portion 5 is configured, so that is can be disengaged from the mirror housing 2 under a respective load. Like in the previous embodiments the rim portion 5 can be provided over its entire circumference as described infra. However, it is also possible to provide only one or several partial portions in the rim portion 5, wherein said partial portions can be disengaged from the mirror housing 2 under a respective load. The rim portion 5 comprises a narrow flange 37, through which it contacts the inside of the mirror housing 2 and through which it is connected to the mirror housing 2, e.g. glued or welded. The glue layer 39 is advantageously provided only between the flange 37 and the inside of the mirror housing 2. The rim portion 5 is connected to the flange 37 and is disposed opposite to the free front face of the mirror housing 2, forming a narrow separation gap 38. However, the rim portion 5 can also rest against the front face of the mirror housing 2. Like in the previous embodiments, the parting point to the mirror housing 2 is offset from the mirror glass 16. Thereby, the mirror glass 16 or the mirror glass carrier 15 contact the rim portion 5 at a distance from the connection point to the mirror housing 2 under a respective load. Under a respectively high load, the rim portion or the respective partial portion is disengaged from the mirror housing 2 by disengaging the flange 37 from the inside of the mirror housing 2. The glue used for the glue layer 39 is selected so that, on the one hand, it assures a sufficiently firm connection of the rim portion 5 to the mirror housing 2, and that it allows a disengagement of the flange 37 from the mirror housing 2 on the other hand. Since the mirror glass 16 or the mirror glass carrier 15 contact the rim portion 5 at a distance from the connection portion of the mirror housing 2, a respective lever arm is formed, which facilitates the disengagement or pivoting away of the rim portion 5.

Since the rim portion is not damaged or destroyed in the embodiments according to FIG. 6, when it is disengaged from the mirror housing 2, it is possible to reattach it to the mirror housing 2.

What is claimed is:

1. A rear-view mirror for vehicles, comprising:
   a mirror housing defining an opening facing rearward when said rear-view mirror is secured to the vehicle;
   a mirror glass disposed within said opening and pivotal therewithin; and
   said mirror housing including a rim portion operatively secured to said mirror housing having a gap disposed therebetween, said rim portion extending around said opening and spaced apart from said mirror glass, said rim portion movable with respect to said mirror housing and pivotally movable with respect to said mirror glass to vary an amount of space between said rim portion and said mirror glass assisting in removal of foreign objects that may lodge between said rim portion and said mirror glass.

2. A rear-view mirror according to claim 1, wherein said rim portion springs back into its initial position after a deflection.

3. A rear-view mirror according to claim 1, wherein said rim portion is detachable from said mirror housing when a force greater than a rated break point is applied.

4. A rear-view mirror according to claim 3, wherein said mirror housing includes a bar having a thickness less than said rim portion extend between said rim portion and said mirror housing.

\* \* \* \* \*